(12) United States Patent
Ross

(10) Patent No.: US 7,782,596 B2
(45) Date of Patent: Aug. 24, 2010

(54) POWER DISTRIBUTION SYSTEM WITH INDIVIDUALLY ISOLATABLE FUNCTIONAL ZONES

(76) Inventor: Bradley Leighton Ross, 10 Deviation Road, Belgrave South (AU) 3160

( * ) Notice: Subject to any disclaimer, the term of this patent is extended or adjusted under 35 U.S.C. 154(b) by 0 days.

(21) Appl. No.: 12/158,642

(22) PCT Filed: Dec. 20, 2006

(86) PCT No.: PCT/AU2006/001949

§ 371 (c)(1),
(2), (4) Date: Nov. 19, 2008

(87) PCT Pub. No.: WO2007/070955

PCT Pub. Date: Jun. 28, 2007

(65) Prior Publication Data

US 2009/0073641 A1    Mar. 19, 2009

Related U.S. Application Data

(60) Provisional application No. 60/791,732, filed on Apr. 13, 2006.

(30) Foreign Application Priority Data

Dec. 20, 2005    (AU) ............................... 2005907178

(51) Int. Cl.
    *H02B 1/04*    (2006.01)

(52) U.S. Cl. ................ 361/648; 361/641; 361/642; 361/643

(58) Field of Classification Search .................. None
See application file for complete search history.

(56) References Cited

U.S. PATENT DOCUMENTS

RE23,797 E  *  3/1954  Miller ........................ 307/17

(Continued)

FOREIGN PATENT DOCUMENTS

EP        0 551 649 A2    12/1992

(Continued)

OTHER PUBLICATIONS

International Search Report, mailed Mar. 1, 2007, for PCT/AU2006/001949, 4 pages.

(Continued)

*Primary Examiner*—Boris L Chervinsky
(74) *Attorney, Agent, or Firm*—Seed IP Law Group PLLC

(57) ABSTRACT

A power distribution system having a plurality of individually isolatable functional nodes each connected via an isolating device to a power distribution bus that is connected via an isolating device to a power input node which is connectable to a power source, wherein the power distribution bus and the isolating devices are housed in a power distribution compartment, and wherein the power input node and the functional nodes are housed separately from one another and the power distribution compartment in functional compartments adjacent thereto.

5 Claims, 15 Drawing Sheets

U.S. PATENT DOCUMENTS

| | | | | |
|---|---|---|---|---|
| 5,184,278 | A * | 2/1993 | Jordan et al. | 361/627 |
| 5,761,027 | A * | 6/1998 | Flegel | 361/664 |
| 6,181,028 | B1 * | 1/2001 | Kern et al. | 307/64 |
| 6,570,754 | B2 * | 5/2003 | Foley et al. | 361/648 |
| 7,005,590 | B1 * | 2/2006 | Willis | 200/50.32 |
| 7,209,343 | B2 * | 4/2007 | Remmert et al. | 361/634 |
| 7,405,923 | B2 * | 7/2008 | Kelly et al. | 361/644 |
| 7,599,171 | B1 * | 10/2009 | Remmert | 361/631 |

FOREIGN PATENT DOCUMENTS

| | | |
|---|---|---|
| FR | 2 638 910 A1 | 5/1990 |
| JP | 59-230410 | 12/1984 |
| JP | 8-149666 | 6/1996 |
| JP | 11-75307 | 3/1999 |
| JP | 2003-324809 | 11/2003 |
| SU | 1772853 A1 | 10/1992 |
| WO | 00/31844 A1 | 6/2000 |
| WO | 03/073221 A2 | 9/2003 |

OTHER PUBLICATIONS

Derwent WPI accession No. 1993-228529/199329, EP 551649, Dec. 24, 1992.

Derwent WPI accession No. 1990-195864/199026, FR 2638910, Sep. 28, 1988.

Derwent WPI accession No. 1996-327893/199633, JP 8149666, Jun. 7, 1996.

Derwent WPI accession No. 1985-035623/198506, JP 59230410, Dec. 25, 1984.

Derwent WPI accession No. 1999-251556/199921, JP 11075307, Mar. 16, 1999.

Derwent WPI accession No. 2003-872326/200381, JP 2003324809, Nov. 14, 2003.

Derwent WPI accession No. 1993-350129/199344, SU 1772853, Oct. 30, 1992.

* cited by examiner

POWER DISTRIBUTION SYSTEM WITH INDIVIDUALLY ISOLATABLE FUNCTIONAL ZONES

FIELD OF THE INVENTION

The present invention relates to power distribution systems with individually isolatable functional zones.

BACKGROUND OF THE INVENTION

Electrical power distribution systems, for example industrial switchboards, generally contain a bank of supply conductors to which switchgear is connected. The supply conductors allow the flow of large currents through the switchboard, and are generally single insulated, partially bare or not fully insulated. Human interaction with live supply conductors during maintenance, servicing, modification, etc, therefore poses a severe electrocution hazard and a major risk to power supply continuity.

A need therefore exists for a solution that enables electrical power distribution systems to be safely worked on without compromising power supply continuity.

SUMMARY OF THE INVENTION

According to the present invention, there is provided a power distribution system having a plurality of individually isolatable functional nodes each connected via an isolating device to a power distribution bus that is connected via an isolating device to a power input node which is connectable to a power source, wherein the power distribution bus and the isolating devices are housed in a power distribution compartment, and wherein the power input node and the functional nodes are housed separately from one another and the power distribution compartment in functional compartments adjacent thereto.

The power distribution bus can be connected via an isolating device to an alternative power input/output node which is connectable to an alternative power source or a power output, wherein the alternative power input/output node is separately housed in a functional compartment adjacent to the power distribution compartment.

The isolating devices can be selected from isolating switches, circuit breakers, fuses, and combinations thereof.

The power distribution compartment can have a cover with apertures through which the isolating devices are individually accessible to enable the functional nodes, the power input node, and the alternative power input/output node to be individually isolated from the power distribution bus.

The power distribution compartment and the functional compartments can be housed together in a power distribution unit cabinet or a switchboard cabinet.

BRIEF DESCRIPTION OF THE DRAWINGS

Embodiments of the invention will now be described by way of example only with reference to the accompanying drawings, in which.

DETAILED DESCRIPTION OF THE EMBODIMENTS

Figure 1A:
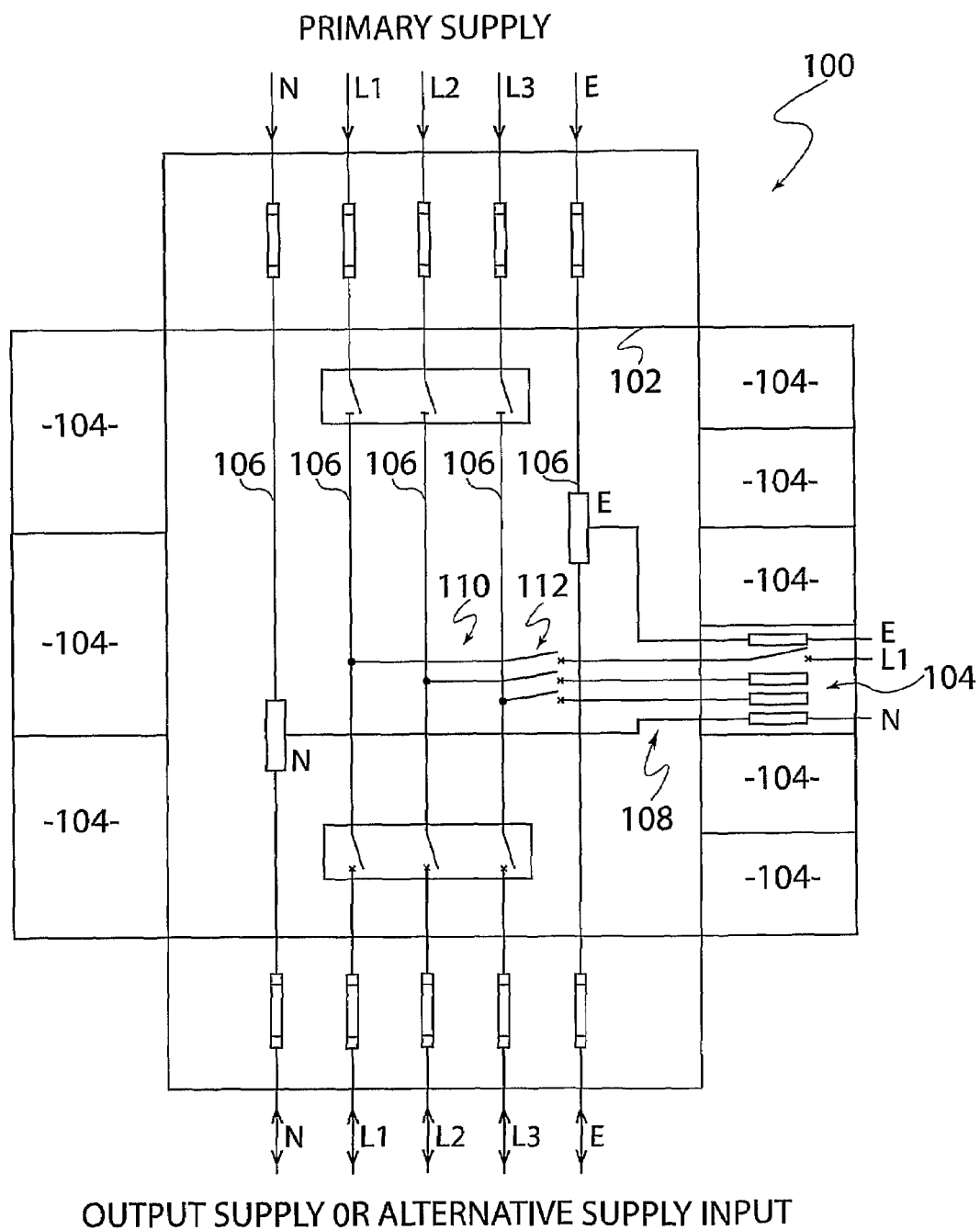
FIGS. 1A-C are schematic diagrams of embodiments of a switchboard having a single isolatable functional zone according to the present invention.

FIG. 1A illustrates an electrical switchboard 100 having an enclosure 102 and a plurality of electrically insulated and/or earthed box shaped functional compartments 104 positioned along opposite sides of the enclosure 102. The functional compartments 104 formed from electrically insulative material or earthed-metal material. The enclosure 102 and the functional compartments 104 can be integrally formed or a modular assembly. Electric current is supplied through three-phase, five-wire supply conductors 106 that extend through the enclosure 102. Three-phase, five-wire distribution conductors 108 are electrically connected to corresponding ones of the supply conductors by teed feeder conductors 110. Isolation switches 112 are interposed between the teed feeder conductors 110 and insulated functional compartment 104. Suitable isolation switches 112 can include, for example, isolators, circuit breakers, fuses, etc. The isolation switches 112 and the functional compartment 104 together provide an electrically isolatable functional zone for making and breaking electrical connections with the distribution conductors 108 without de-energising the supply conductors 106 within the live zone of the enclosure 102.

In FIG. 1A, the isolation switches 112 are circuit breakers and the functional compartment 104 of the isolatable functional zone is fitted with a functional node consisting of a single-phase output circuit breaker. The distribution conductors 108 pass directly from the isolatable functional zone into the circuit breaker in the functional compartment 104 without exposing any live conductors. Thus, an electrician who is required to work with the compartment 104 can do so without fear of accidentally coming into contact with a live conductor.

Figure 1B:
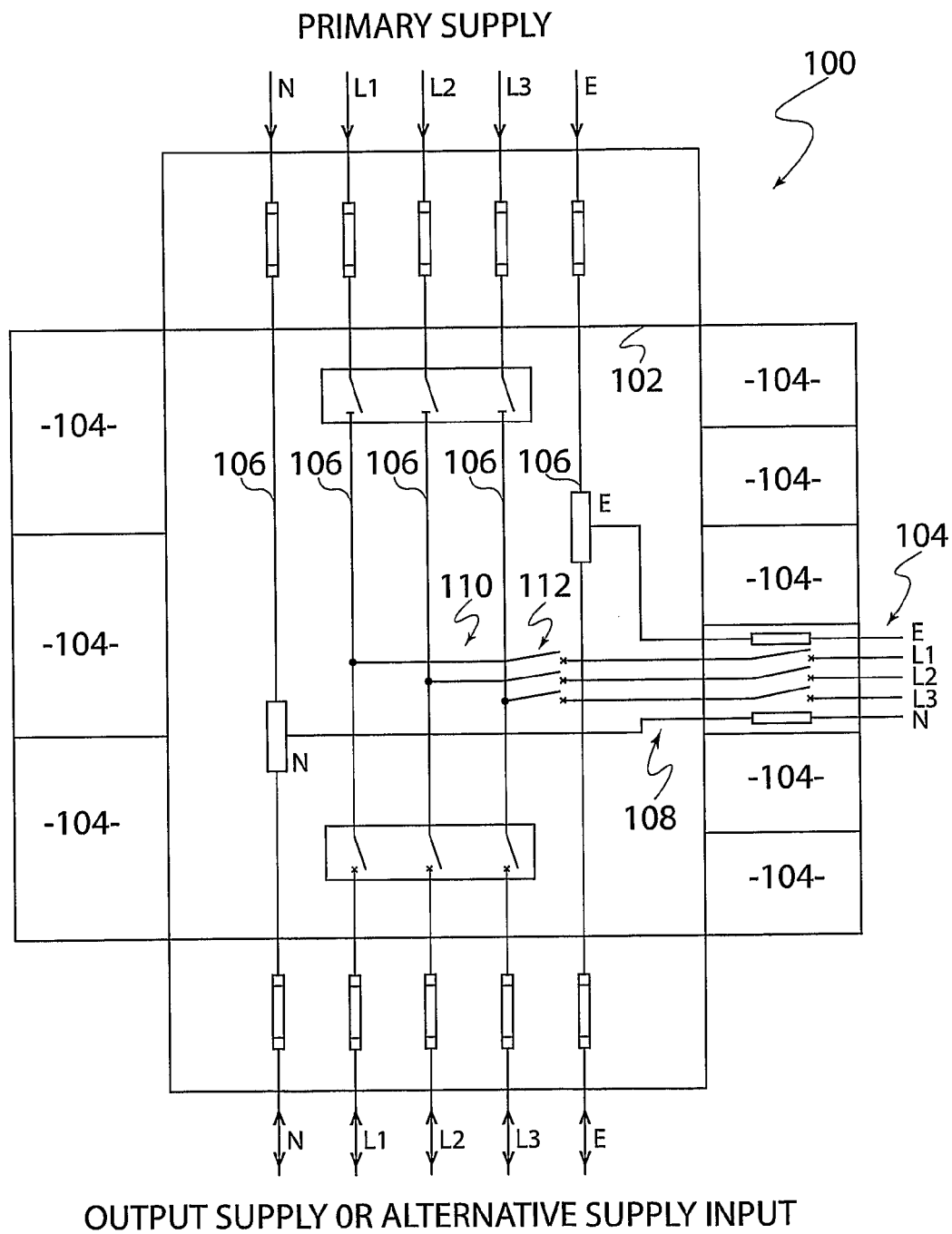
Figure 1C:
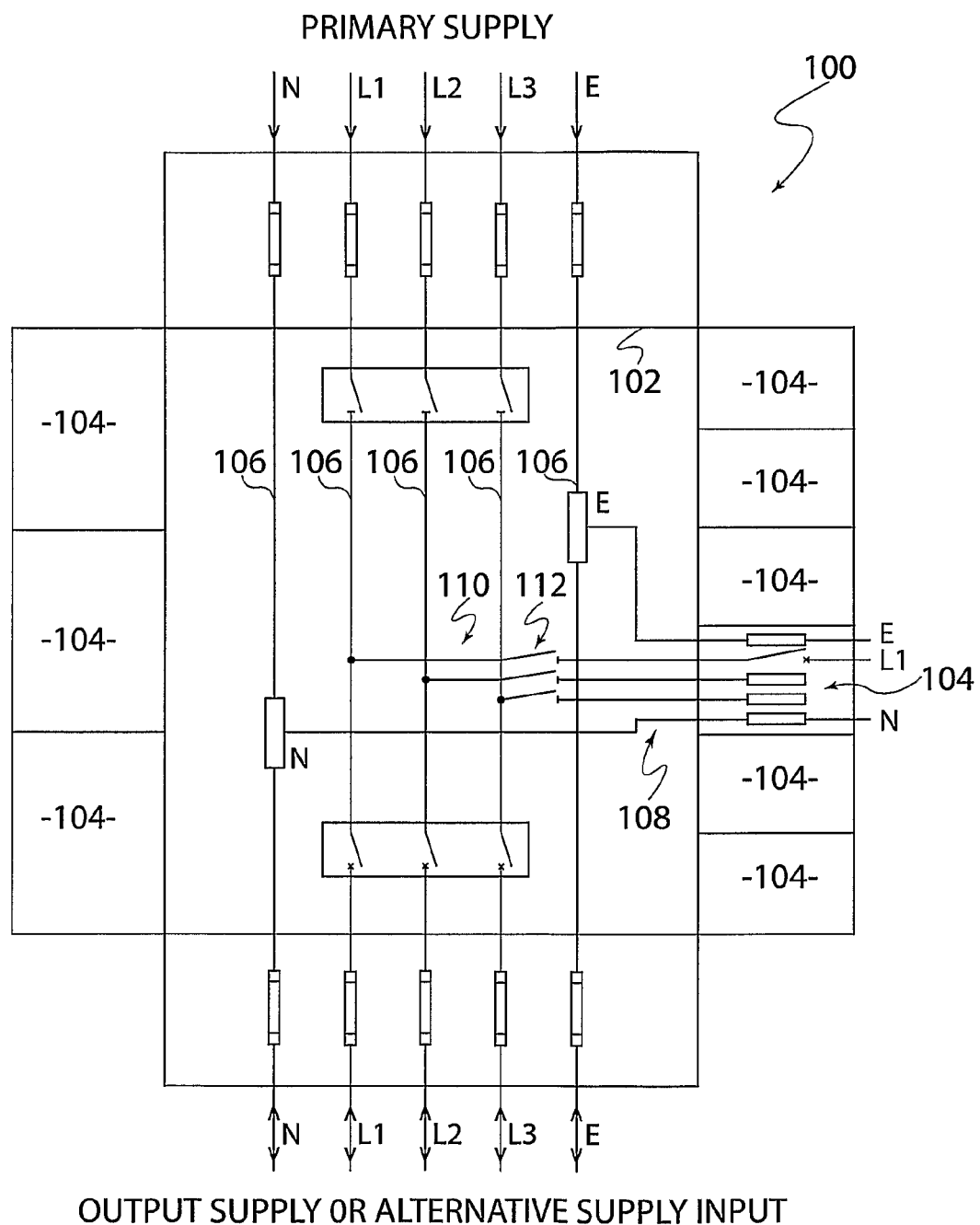

The switchboard of FIG. 1B is substantially identical to that of FIG. 1A. Here the isolatable functional zone is fitted with a three-phase output circuit breaker. In FIG. 1C, the isolation switches 112 are isolators, and the isolatable functional zone is fitted with a single-phase output circuit breaker. For the purposes of clarity, example electrical connections and example circuit components for only one isolatable functional zone are illustrated in FIGS. 1A-C. It will be appreciated that the switchboard 100 can be implemented with any suitable number of isolatable functional zones having any and all single-phase or multi-phase combinations of conventional isolation switches 112 and conventional electrical circuits, components, devices, etc.

Figure 2:
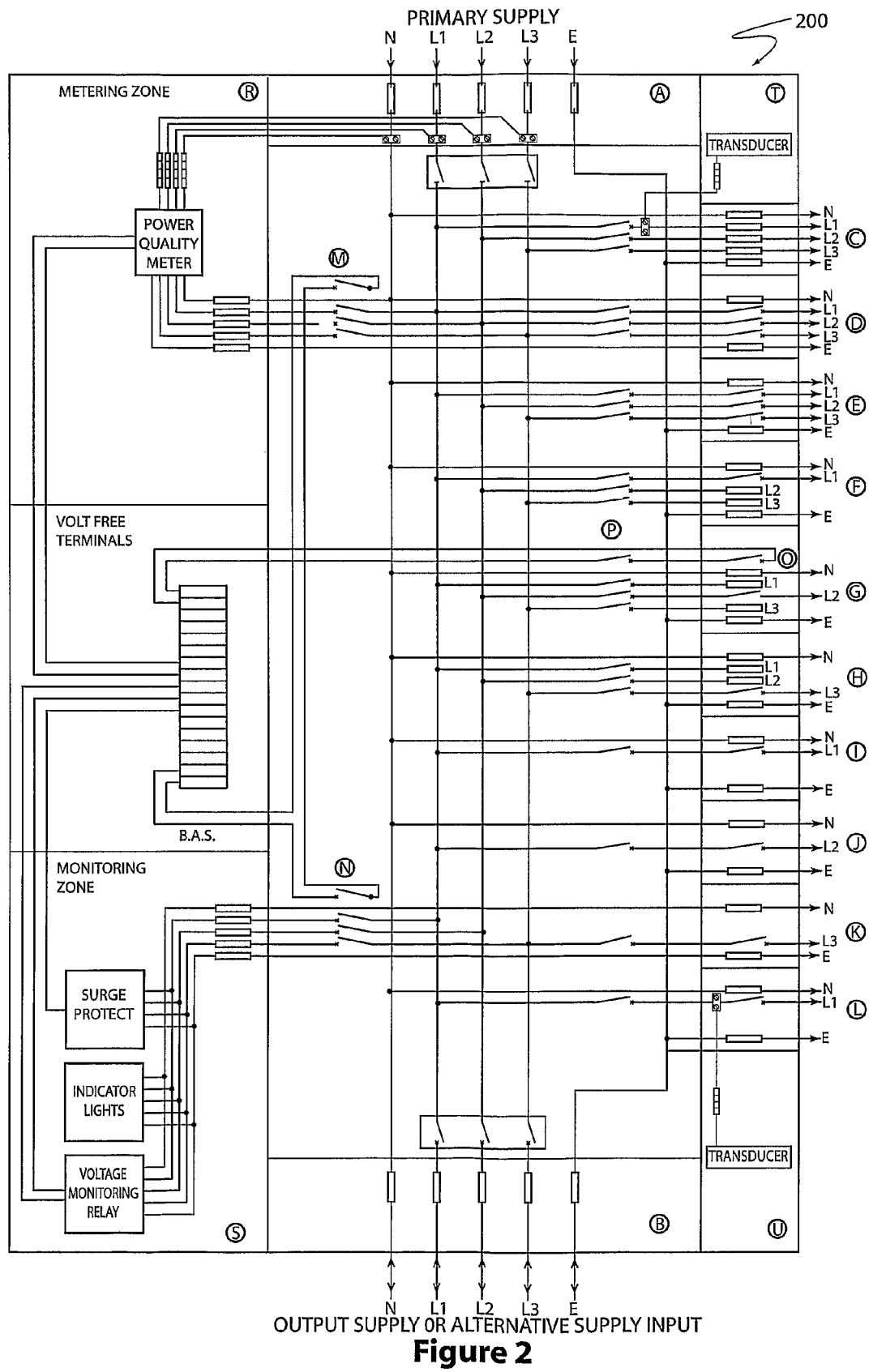
FIG. 2 is a schematic diagram of an embodiment of a switchboard of the present invention having multiple different isolatable functional zones.

FIG. 2 illustrates an example switchboard 200 having multiple different three-phase, three-pole isolatable functional zones with example electrical circuits, components, devices, etc, indicated by the following reference letters.

A Primary input supply.

B Alternative input supply/fully rated output supply.

C Three-phase upstream circuit breaker protection to an isolatable functional zone fitted with three phase output terminals.

D Three-phase isolator with fully rated link (cable or bar) supplying an isolatable functional zone fitted with a three-phase output circuit breaker.

E Three-phase upstream circuit breaker protection to supplying an isolatable functional zone fitted with three-phase output circuit breaker.

F Three-phase upstream circuit breaker protection to an isolatable functional zone fitted with a single-phase output circuit breaker.

G Three-phase upstream circuit breaker protection to an isolatable functional zone fitted with a single-phase output circuit breaker.

H Three-phase upstream circuit breaker protection to an isolatable functional zone fitted with a single-phase output circuit breaker.

I Single-phase upstream circuit breaker protection to an isolatable functional zone fitted with a single-phase output circuit breaker, J Single-phase upstream circuit breaker protection to an isolatable functional zone fitted with a single-phase output circuit breaker.

K Single-phase upstream circuit breaker protection to an isolatable functional zone fitted with a single-phase output circuit breaker.

L Single-phase isolator with fully rated link (cable or bar) supplying an isolatable functional zone fitted with a single-phase output circuit breaker.

M Volt free auxiliary status contacts fitted to circuit breakers that supply metering equipment for volt free isolatable functional zones/volt free conductors.

N Volt free auxiliary status contacts fitted to circuit breakers that supply monitoring and surge protection equipment for volt free isolatable functional zones/volt free conductors.

O Volt free auxiliary status contacts fitted to a single-phase output circuit breaker/ volt free conductors within an isolatable functional zone.

P Volt free auxiliary status contacts fitted to a three-phase upstream circuit breaker/volt free conductors.

Q Volt free terminal isolatable functional zone for building automation system (BAS) interface.

R Metering isolatable functional zone with current transformer bridging as a shorting facility to eliminate risk of electrocution in conjunction with isolation of three phase supply to the metering isolatable functional zone/ volt free output conductors that terminate in the adjacent volt free isolatable functional zone Q.

S Monitoring/surge protection/indicators lights isolatable functional zone in conjunction with isolation of three phase supply to the monitoring isolatable functional zone/volt free output conductors that terminate in the adjacent volt free isolatable functional zone Q.

T Transducer isolatable functional zone for a current transformer located within the live zone within the enclosure so as to provide a non-serviceable current transformer without isolation of the entire switchboard 200.

U Transducer isolatable functional zone for a current transformer located within the adjacent isolatable functional zone L so as to provide a serviceable current transformer without isolation of the entire switchboard 200.

The above electrical circuits, components, devices, etc, and isolatable functional zones are examples only. It will be appreciated that the switchboard 200 can be alternatively implemented with any and all single-phase or multi-phase combinations of conventional electrical circuits, components, devices, etc.

Figure 3A:
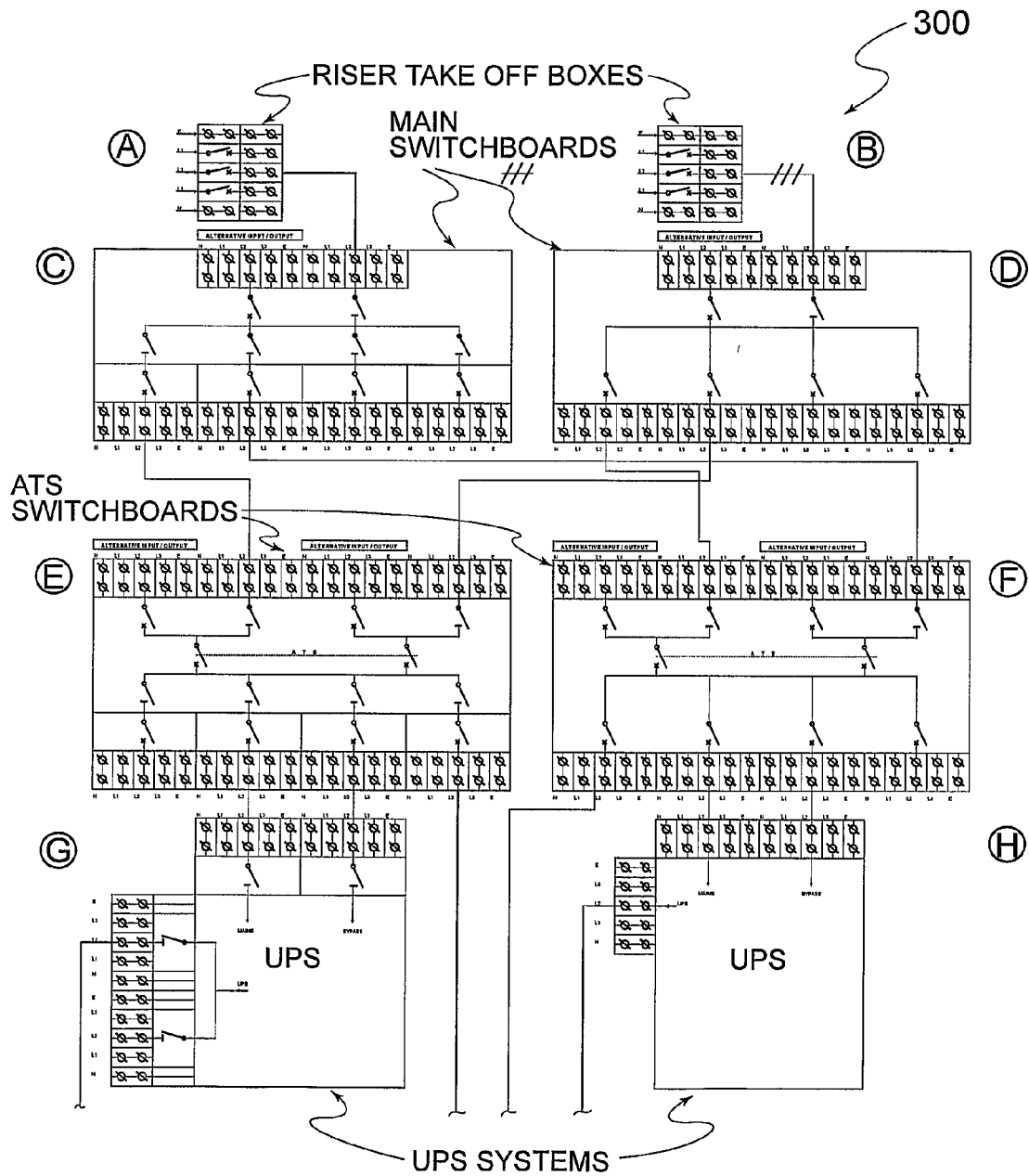
FIGS. 3A-B are schematic diagrams of a data centre uninterruptible power supply (UPS) system that includes embodiments of isolatable functional zones of the present invention.
Figure 3B:
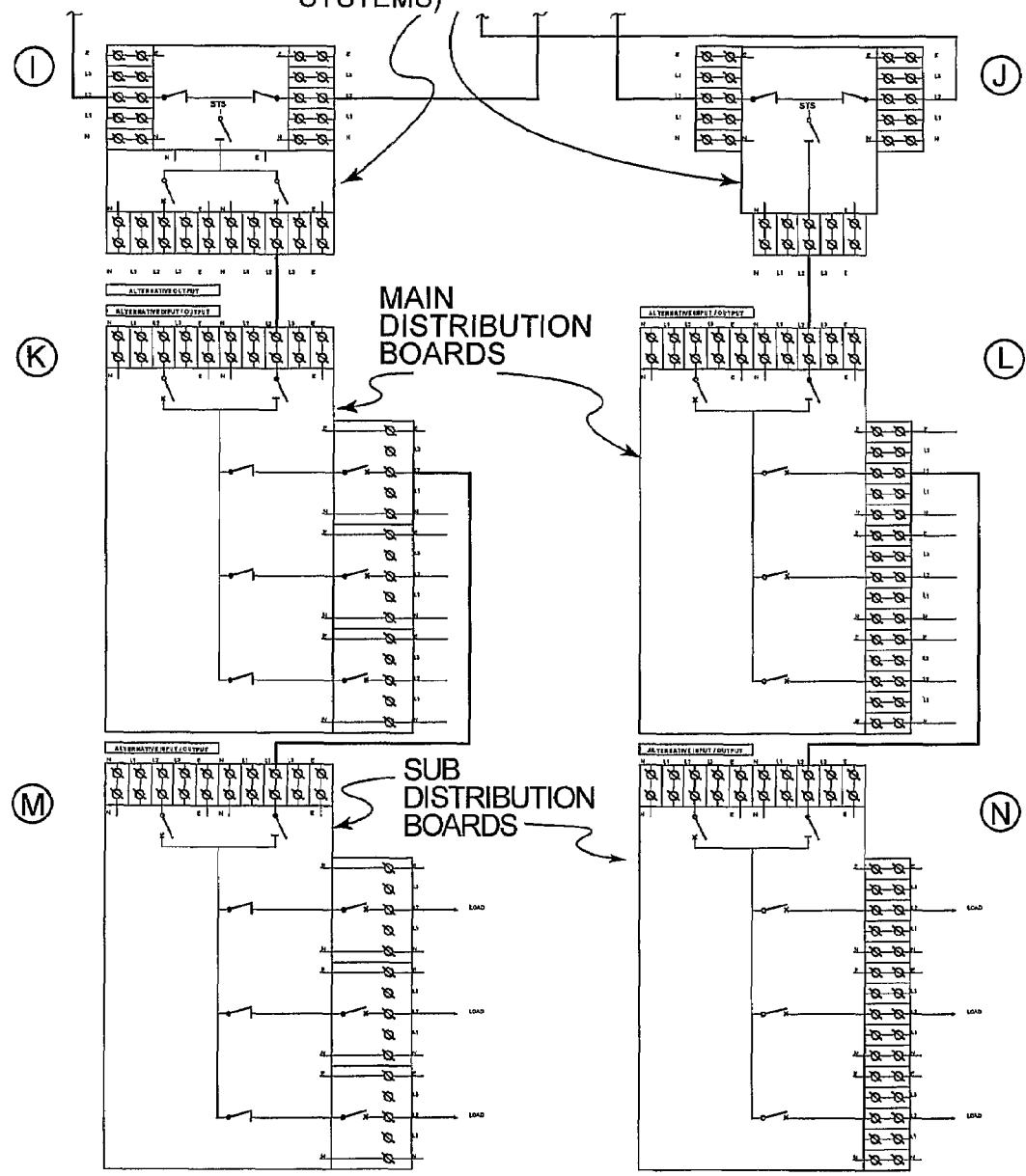

FIGS. 3A-B illustrate example isolatable functional zones of the present invention implemented in an electrical distribution system 300, for example, a three-phase, five-wire electrical distribution system used in an industrial site, for example, a dual UPS reticulation system in a data centre. Referring to FIG. 3A, electrical power is supplied to the system 300 from two risers. The take off boxes A, B for the risers each have isolatable functional zones to change protective devices and disconnect or connect conductors within the functional zones without isolating the respective risers.

The main switchboards C, D of the system 300 each have isolatable functional zones for primary and alternative input supplies. Automatic transfer switch (ATS) switchboards E, F have isolatable functional zones for primary and alternative input supplies to both supplies. In each switchboard C, D, E, F, either of the primary or the alternative input supply isolatable functional zones can be used to provide a fully rated output supply. The respective isolating protective devices within the live zone of the switchboards C, D, E, F can be changed to suit varying site requirements to supply isolatable functional zones fitted with terminals or bolted crimped lug connections. The reserved isolatable functional zones in switchboards C, D, E, F can be fitted with terminals or bolted crimped lug connections for the purpose of supplying down stream switchboards/equipment to provide a parallel alternative supply during maintenance of, updating and increasing capacity of the system 300. Switchboards G, H have isolatable functional zones which can provide options for reconfiguring cabling without disrupting supply continuity.

Referring to FIG. 3B, static transfer switches I, J each include isolatable functional zones to enable cable reconfiguration without power disruption. The main distribution boards and the sub-distribution boards of the system 300 are respectively provided by switchboards K, L and switchboards M, N. Each of these switchboards have isolatable functional zones which provide the same general functionality as discussed above in relation to switchboards C, D, E, F. To provide final sub-circuit distribution in the system 300, the sub-distribution switchboards M, N can have isolatable functional zones generally similar to those discussed and above in relation to switchboard 200 and depicted in FIG. 2.

Figure 4:
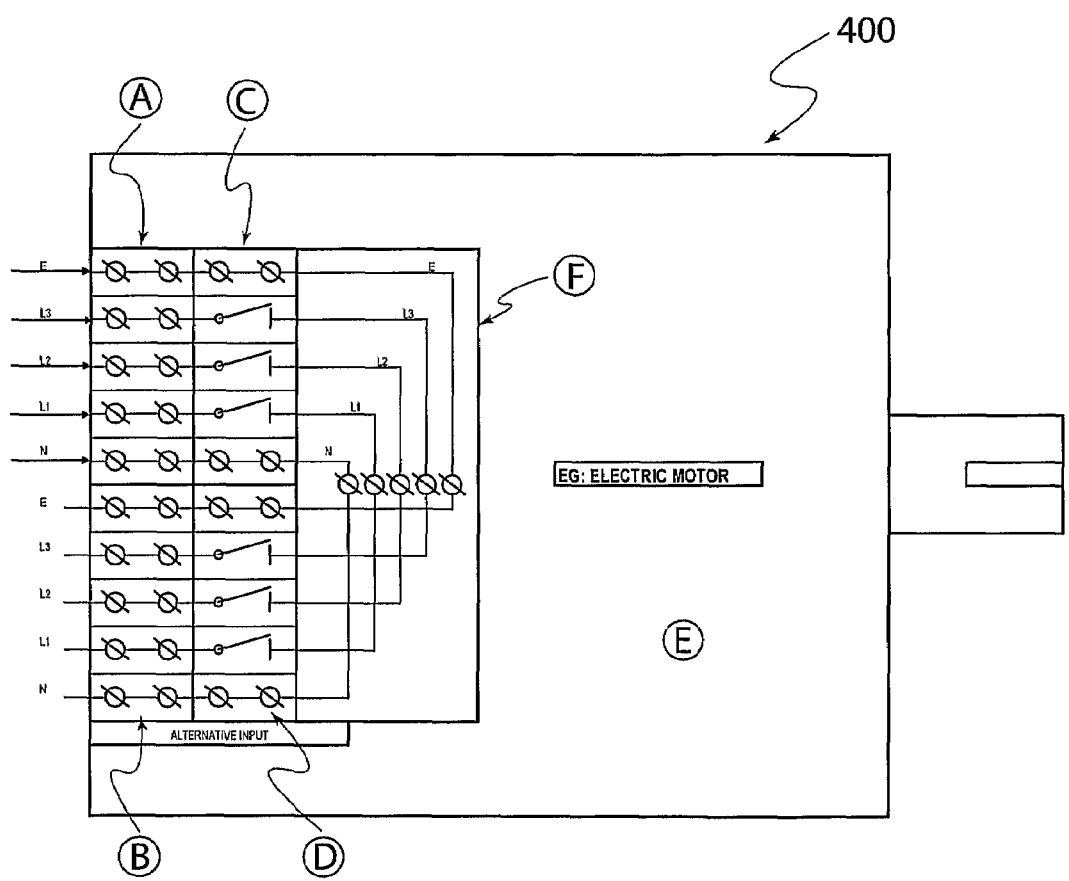
FIG. 4 is a schematic diagram of an electric motor having a power distribution system of an embodiment of the invention with individually isolatable functional zones.

FIG. 4 illustrates isolatable functional zones 400 of the invention implemented with a critical load E that requires a substantially continuous power supply, for example, an electric motor, electric equipment, computer equipment, communications equipment, etc. Isolatable functional zone A 400 provides primary input supply, and zone B provides alternative parallel input supply. A primary input supply isolator is included in isolatable functional zone C, and zone D includes an alternative parallel input supply isolator. Zone F provides connection terminals to the critical load E. In use, the parallel input supplies of the isolatable functional zones A, B, C, D can be sequentially and alternatively disconnected and connected to primary and alternative main switchboards/supplies so as to provide continuity of supply to the critical load E in the event that its primary switchboard/supply needs to be shutdown for electrical repairs.

Figure 5:
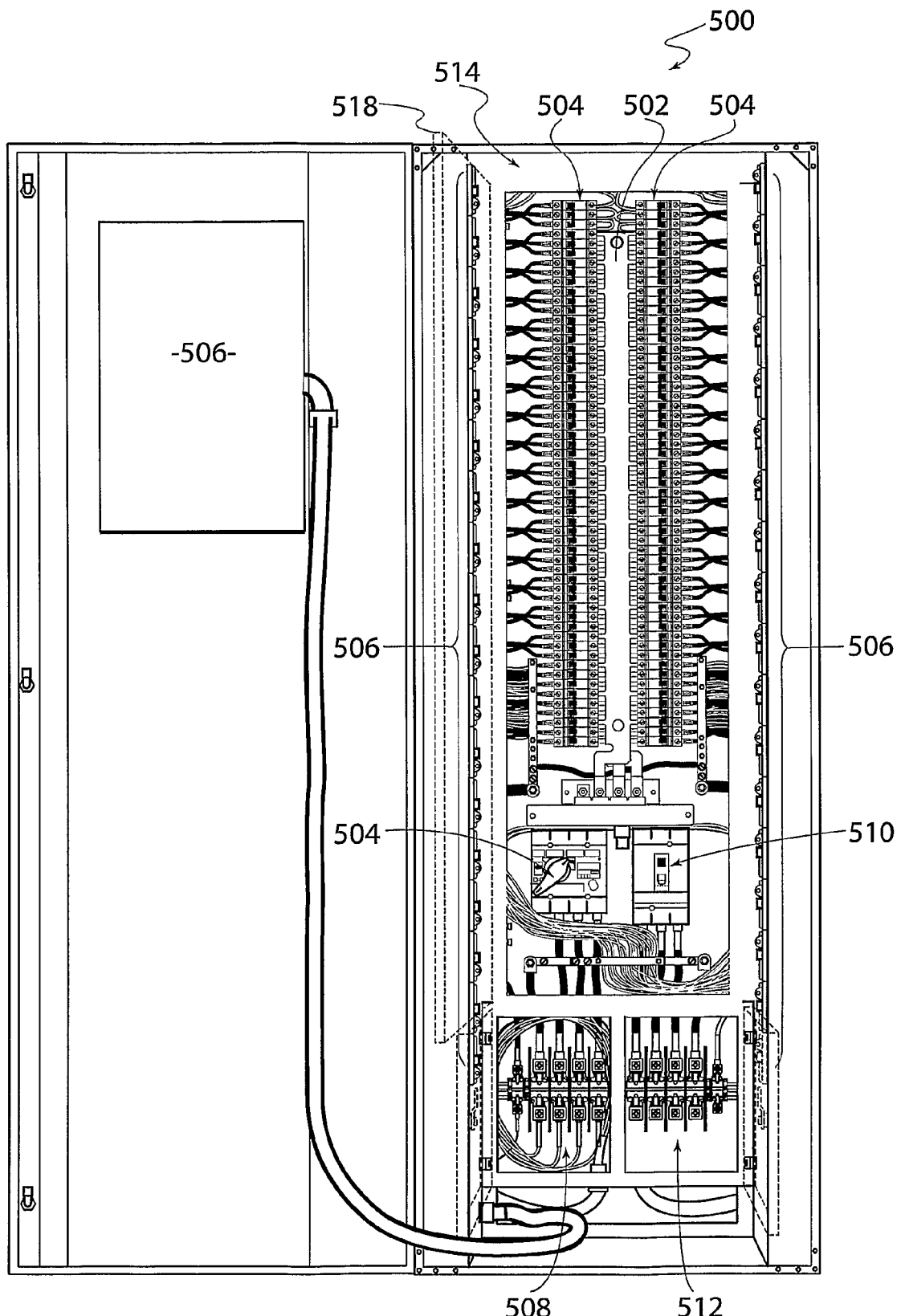
FIGS. 5 and 6 are front views of a power distribution unit cabinet of one embodiment of the invention.
Figure 6:
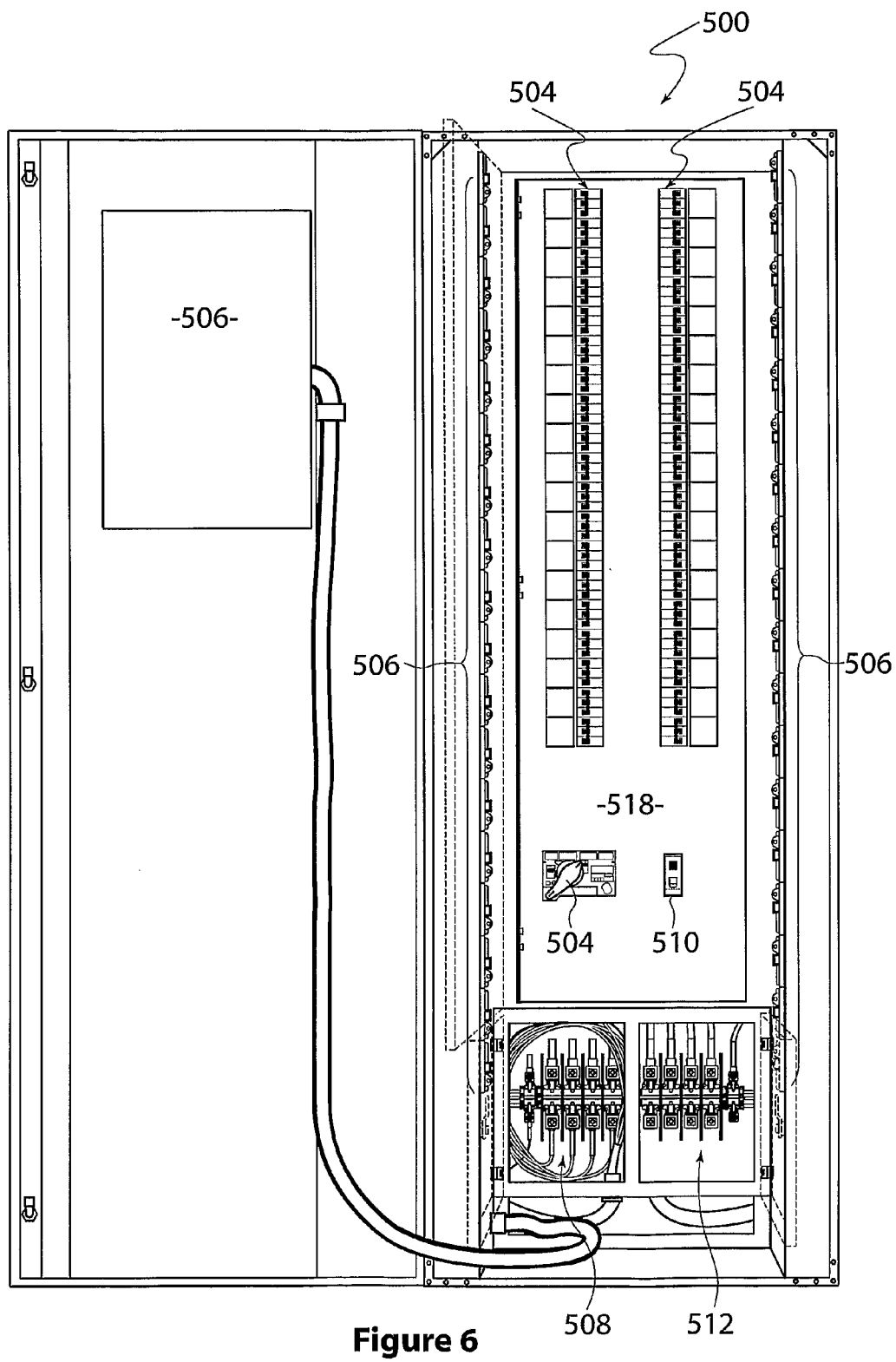
Figure 7:
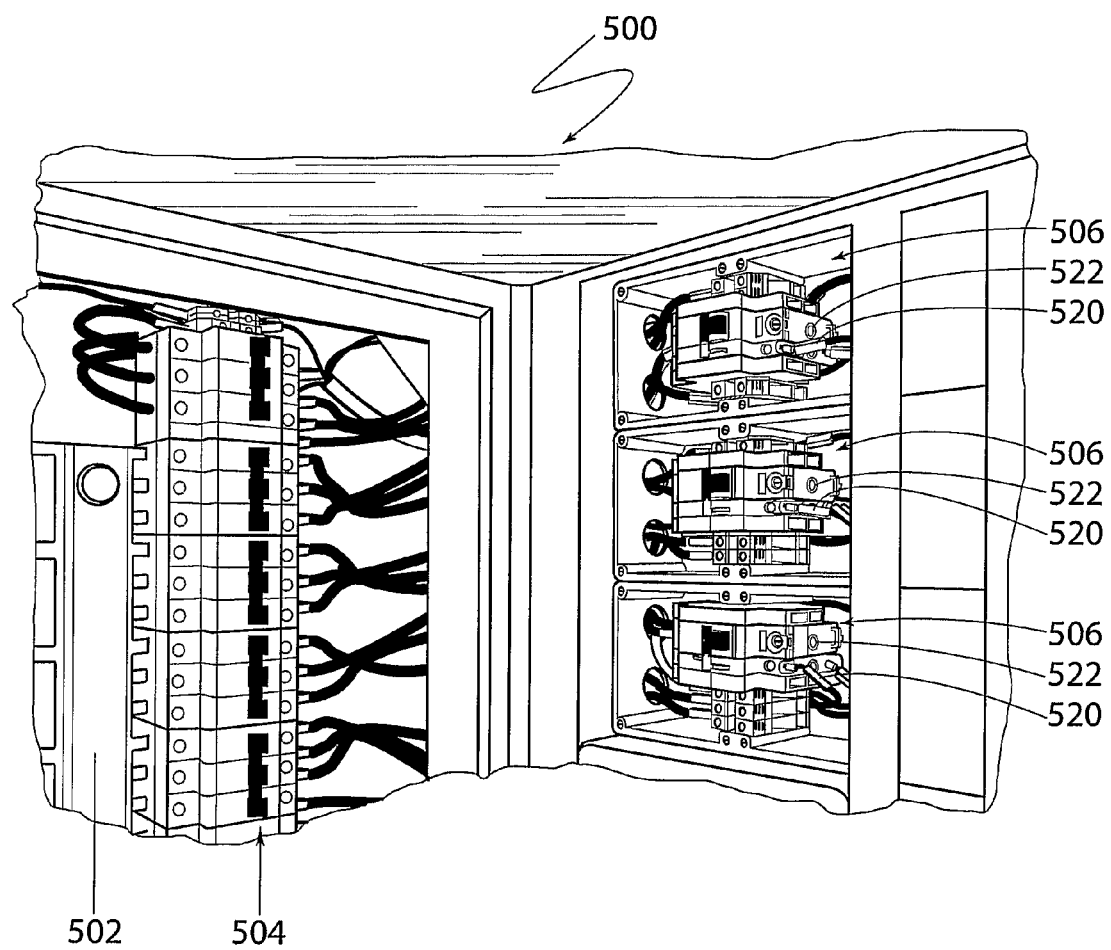
FIG. 7 is a fragmentary perspective view of functional compartments of the power distribution unit cabinet of FIGS. 5 and 6.

FIGS. 5 to 7 illustrate a power distribution unit cabinet 500 of one embodiment of the invention. The power distribution unit cabinet 500 is configured to distribute power to a row of server cabinets (not shown) in a data room. Advantageously, the power distribution unit cabinet 500 is shaped and dimensioned to generally complement the shape and dimensions of the server cabinets. The power distribution unit cabinet 500 includes a power distribution busway (or chassis) 502 that is connected via isolating switches 504 and cables to a plurality of individually isolatable functional nodes 506. The power distribution busway 502 is connected via an isolating switch 504 to a power input node 508 which is connectable to a power source. The power distribution busway 502 is also connected via a circuit breaker 510 to an alternative power input/output node 512 which is connectable to an alternative power source or a power output.

The power distribution busway 502 is housed in an insulated power distribution compartment 514, while the functional nodes 506, the power input node 508, and the alternative power input/output node 512 and are housed separately from one another and the power distribution compartment 514 in adjacent functional compartments having covers. As best seen in FIG. 6, the power distribution compartment 514 has a cover 518 with apertures through which the isolating switches 504 and the circuit breaker 510 are individually accessible to enable the functional nodes 506, the power input node 508, and the alternative power input/output node 512 to be individually isolated from the power distribution busway 502. The functional compartments housing the functional nodes 506, the power input node 508, and the alternative power input/output node 512 can be individually numbered or coded to enable them to be readily located during wiring-in, maintenance and repair. The functional compartments and their covers can be coloured differently from the power distribution compartment 514 and its cover 518 to respectively signify isolatable and live zones of the power distribution unit cabinet 500. For example, the functional compartments and their covers can be coloured white, while the power distribution compartment 514 can be coloured orange.

Figure 8:
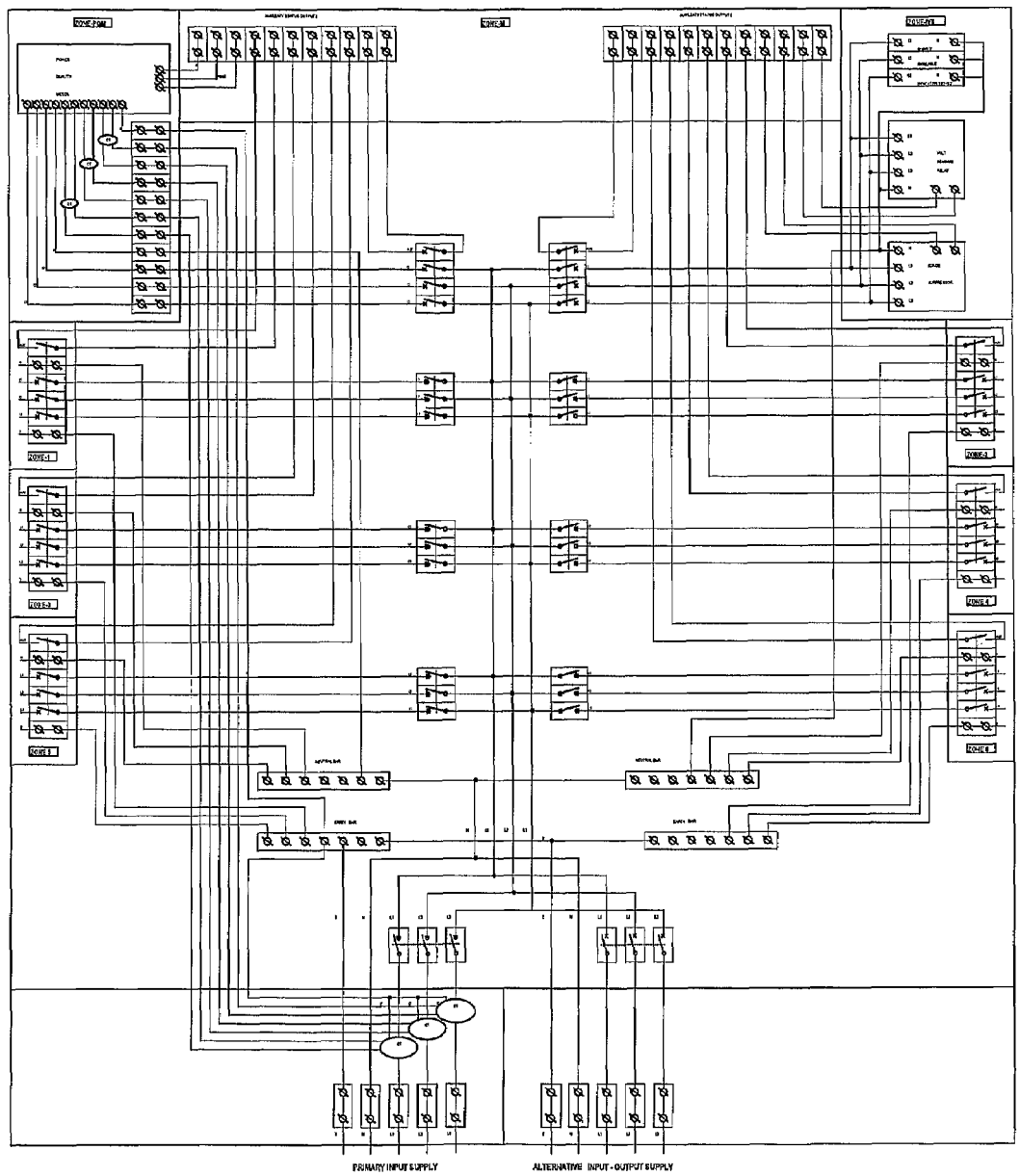
FIGS. 8 to 10 are partial circuit diagrams for six functional nodes of the power distribution unit cabinet of FIG. 5 to 7 showing different three- and four-pole wiring configurations.
Figure 9:
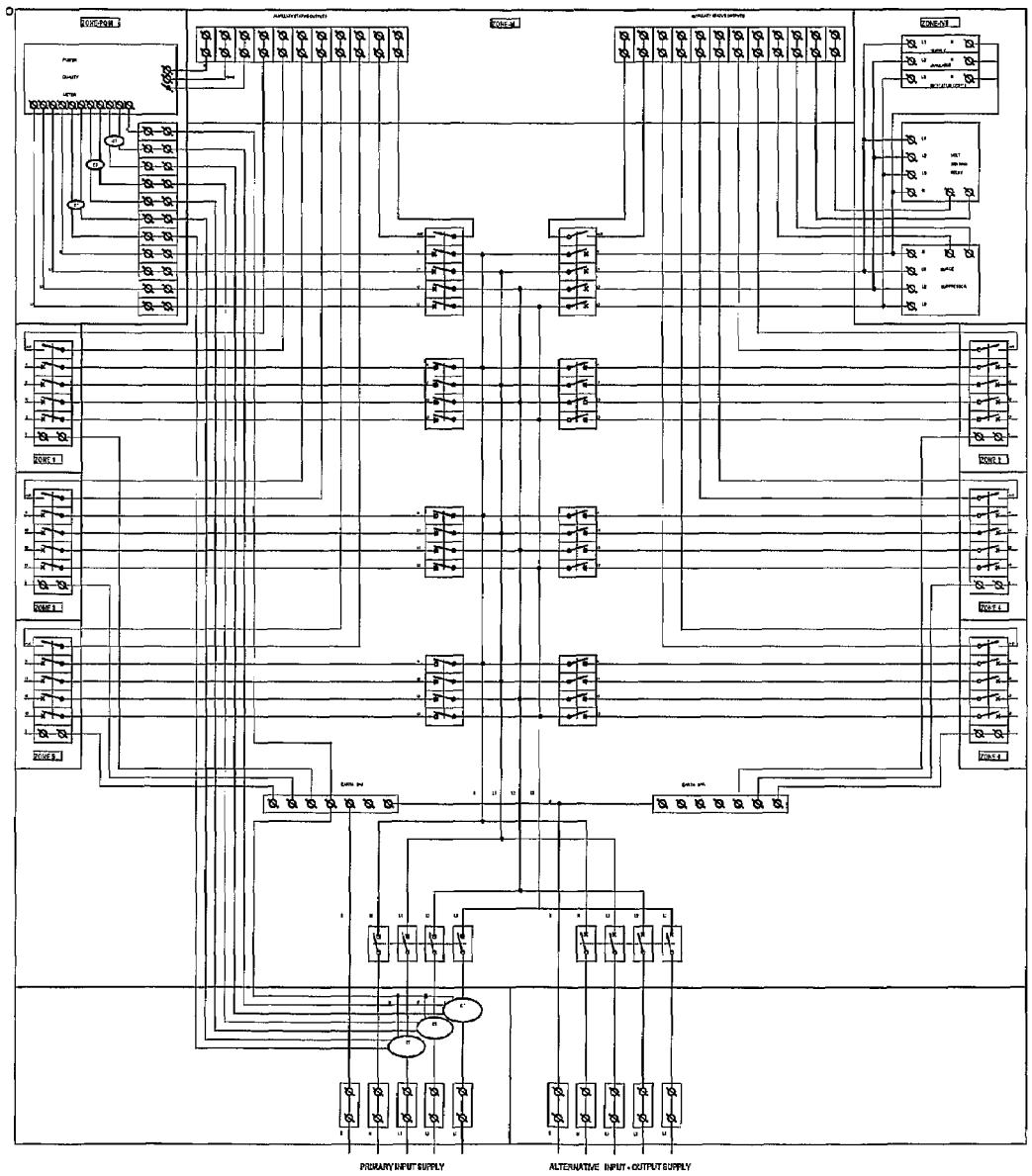
Figure 10:
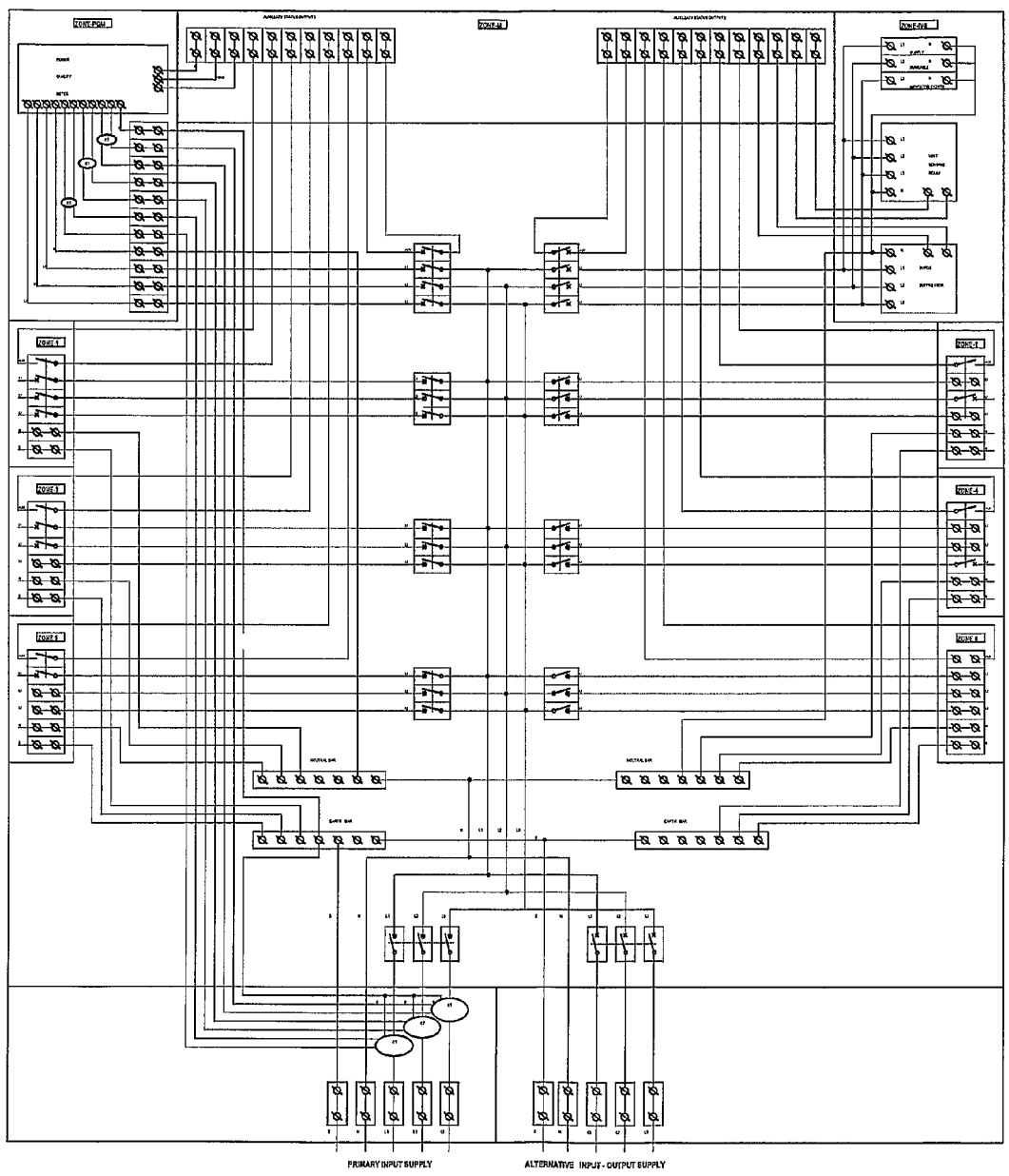

As shown in FIG. 7, the functional nodes 506 housed in the functional compartments (for clarity shown without covers) include auxiliary status contacts 520 fitted to circuit breakers 522. Referring again to FIGS. 5 and 6, one or more functional nodes 506 can be housed in compartments provided in the cover of the power distribution unit cabinet 500. These functional nodes 506 include a power quality meter, supply available indicator lights, a volt sensing relay, and a surge suppressor. It will be appreciated that the functional nodes 506 can be interfaces or connections points for any and all conventional electrical components, devices, instruments, loads, etc. FIGS. 8 to 10 show different three- and four-pole wiring configurations of the power distribution busway 502 and the functional nodes 506 (for clarity only six are shown). It will be appreciated that the power distribution unit cabinet 500 can be alternatively implemented in any and all conventional configuration types or grounding types: number of poles; number of wires; voltage; single- or three-phase; two-pole, three-wire; four-pole, five-wire; two-pole, two wire; three-pole, three-wire; etc.

Figure 11:
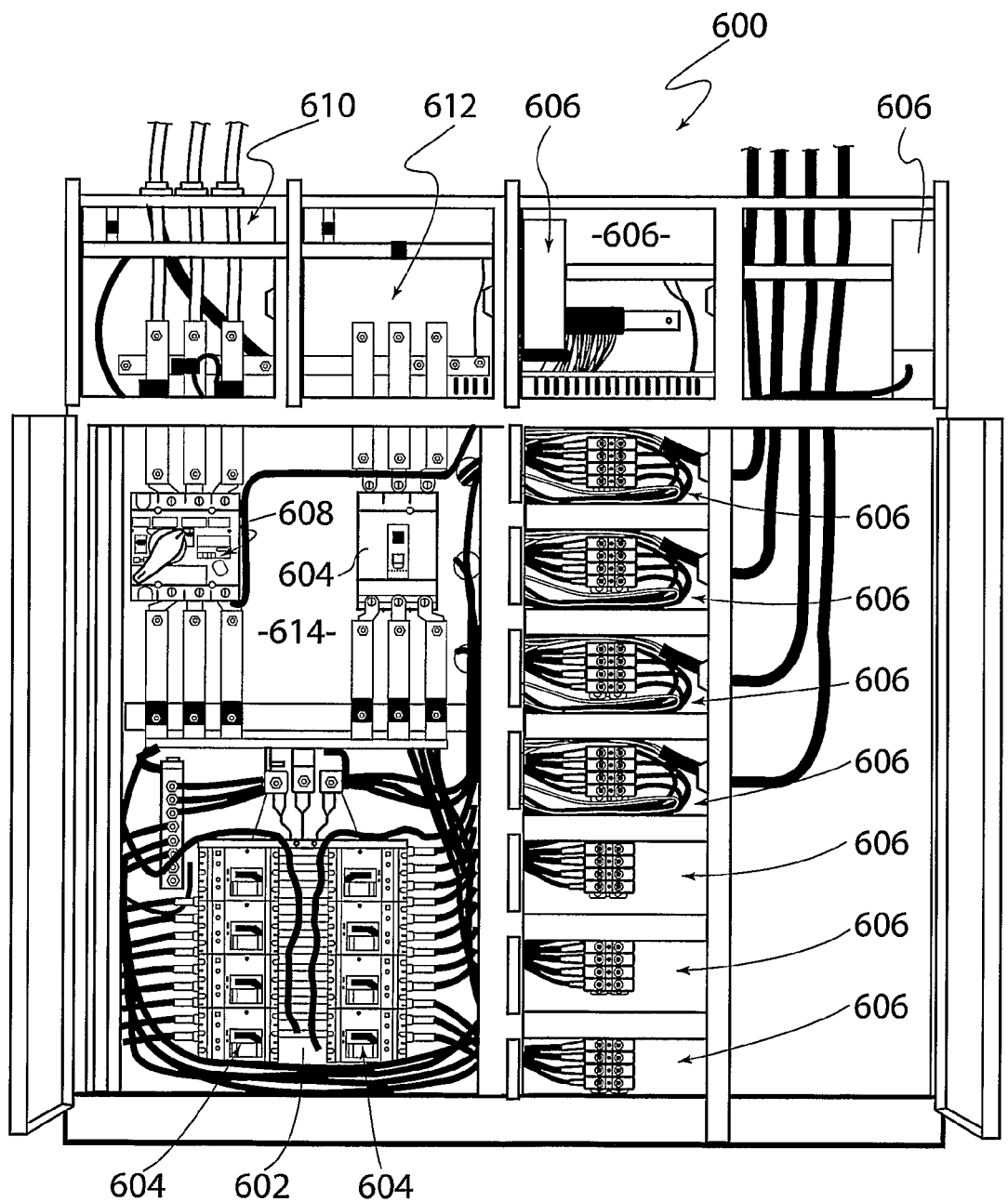
FIG. 11 is a front view of a switchboard cabinet of another embodiment of the invention.

FIG. 11 shows the invention implemented as a switchboard cabinet 600 that generally includes a power distribution busway (or chassis) 602 that is connected via circuit breakers 604 and cables to a plurality of individually isolatable functional nodes 606. The power distribution busway 602 is connected via an isolating switch 608 to a power input node 610 which is connectable to a power source. The power distribution busway 602 is also connected via a circuit breaker 604 to an alternative power input/output node 612 which is connectable to an alternative power source or a power output. The power distribution busway 602 is housed in a power distribution compartment 614, while the functional nodes 606, the power input node 610, and the alternative power input/output node 612 and are housed separately from one another and the power distribution compartment 614 in adjacent functional compartments. The functional compartments and the power distribution compartment 614 each have covers. As before, the cover of the power distribution compartment 614 has apertures (for clarity not shown in FIG. 11) through which the circuit breakers 604 and the isolating switch 608 are individually accessible to enable the functional nodes 606, the power input node 610, and the alternative power input/output node 612 to be individually isolated from the power distribution busway 602. Again, the functional compartments housing the functional nodes 606, the power input node 610, and the alternative power input/output node 612 can be individually numbered or coded to enable them to be readily located during wiring-in, maintenance and repair. In addition, the functional compartments and their covers can be coloured white, while the power distribution compartment 614 can be coloured orange to differentiate between live and isolatable zones of the switchboard cabinet 600.

Figure 12:
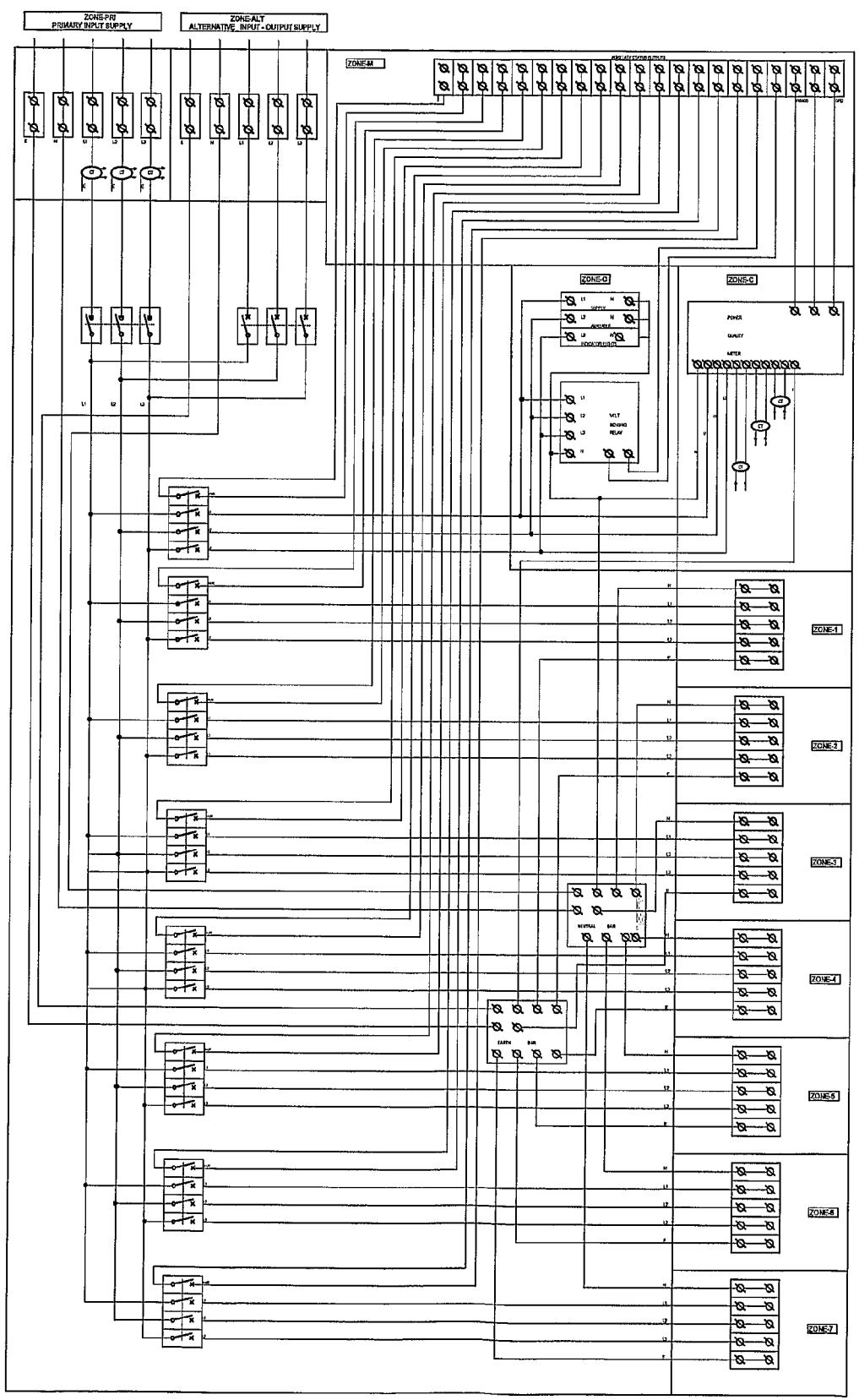
FIG. 12 is a simplified circuit diagram of the switchboard cabinet of FIG. 11.

In the illustrated embodiment, the functional nodes 606 housed in the functional compartments include terminals and auxiliary status outputs. Additional functional nodes 606 are housed in compartments provided in the covers of the functional compartments. These functional nodes 606 include a power quality meter, supply available indicator lights, a volt sensing relay, and a surge suppressor. It will be appreciated that the functional nodes 606 can be interfaces or connections points for any and all conventional electrical components, devices, instruments, circuitry, loads, etc. FIG. 12 shows a three-pole wiring configuration for the power distribution busway 602 and the functional nodes 606, but it will be appreciated that the switchboard cabinet 600 can be alternatively implemented in any and all conventional configuration types or grounding types: number of poles; number of wires; voltage; single- or three-phase; two-pole, three-wire; four-pole, five-wire; two-pole, two wire; three-pole, three-wire; etc.

Embodiments of the power distribution system of the invention can be designed to allow switchboards and power systems supporting telecommunications equipment and other platforms to be worked on safely without persons having to work on live electrical equipment, and without interrupting the continuity of telecommunications equipment and other platforms. Embodiments of the invention provide the following advantages.

Risk—Occupational Health and Safety—Eliminates risk of electrocution of electricians.

Risk—Human Intervention—Eliminates risk of human intervention causing interruption of power to critical loads.

Risks—Loss of power continuity—Enables a multitude of electrical procedures to be performed without electrical isolation of critical loads.

Risk—Financial impact on business—Enables a multitude of electrical procedures to be performed without electrical isolation of critical loads. Reduces the requirement for planned shutdowns of electrical distribution systems which cause loss of power continuity.

Maintenance procedures—In the event that repairs are required to be performed on an upstream switchboard, a fully rated parallel alternative supply for switchboard with switchboard with individually isolatable functional zones without interruption to critical loads.

Upgrade procedures—In the event that re-arrangement/upgrade/alterations to an existing electrical reticulation system is required, a fully-rated parallel alternative input supply (main) for a switchboard can be supplied from an upstream switchboard with individually isolatable functional zones without interruption to critical loads.

End-to-end solution to working on energised critical electrical distribution systems—Elimination of risk of electrocution whilst performing electrical works on energised critical electrical distribution systems. Provides the ability for an electrician to perform works on critical electrical distribution systems without having to isolate electrical distribution infrastructure/switchboards/sub-boards/multiple sub-circuits in order to perform electrical works.

Design Criteria—At the electrical reticulation design stage, the individually isolatable functional zones provide substantial flexibility to provide continuity of power supply to critical loads for maintenance procedures including, for example: thermographic survey—fault repair; upgrade procedures; breakdown—rapid power restoration to critical loads—by being able to access power from an isolatable functional zone switchboard for the connection of temporary cables to supply temporary switchboard to reinstate power to critical loads; AC distribution—all voltages no limitations; DC distribution—all voltages no limitations; current—no limitations.

Embodiments of the invention provide individually isolatable functional zones that when isolated have no live conductors within, eliminating or at least minimising the risk of electrocution. Embodiments enable electricians to isolate an individual isolatable functional zone for each outgoing circuit/cable and alter the protective device within the isolatable functional zone to accommodate changing site requirements without the requirement to isolate the entire switchboard, for example, single phase/three phase 15 to 32 amp outgoing sub circuits/15-32 amp switched outlets in the field.

Embodiments of the invention also provide an individual isolatable functional zone for a fully rated alternative (back-feed) incoming supply circuit/cable, which in addition can be used as a fully-rated outgoing supply circuit. Embodiments further provide individually isolatable functional zones for electrical riser take off boxes. In addition, embodiments enable electricians to isolate individually isolatable functional zones by operating the protective device within the take off box, and allows connection/disconnection of circuit/cable within the isolatable functional zones to accommodate changing site requirements without the requirement to isolate the entire riser.

Embodiments of the invention further provide individually isolatable functional zones for monitoring/metering/surge suppression equipment. This enables electricians to isolate an individual isolatable functional zone for voltage monitoring/power quality metering/surge suppression equipment for upgrade and service purposes.

In addition, embodiments of the invention provide individually isolatable functional zones for volt free connection of BAS terminals. This enables volt free monitoring of circuit breaker status/supply voltage monitoring/surge suppression status which terminates in the individual functional zone for volt free connection to BAS connection terminals.

In switchboard embodiments, the individual isolatable functional zones can be supplied from the live zone of the switchboard via dedicated isolators/circuit breakers/fuses—1, 2 ,3 or 4 pole which are used to isolate each isolatable functional zone. The neutral conductors supplying the isolatable functional zones are terminated within the live zone of the switchboard to a traditional neutral bar and, in the case of 4 pole switching arrangement, the neutral is connected directly to the isolator/circuit breaker—(4 pole). The earth conductors supplying the isolatable functional zones are terminated within the live zone of the switchboard to a traditional earth bar. All internal switchboard conductors between the live zone of the switchboard and the isolatable functional zones are terminated in both zones under screw or crimped lugged and bolted termination and require no specialised shrouding in either live zone or isolatable functional zones. Outgoing sub-main or sub-circuit cable protection 1, 2, 3 phase and 4 pole options can be achieved at the design stage so that when the isolatable functional zone switchboard is commissioned and critical load connected, alterations to the protective devices within the isolatable functional zones can be made. For example, if three-phase 63 amp dedicated isolators/circuit breakers/fuses are used within the live zone to supply the isolatable functional zones, and if conductors between the live zone and the isolatable functional zones are appropriately sized and protected, then the protective devices within the isolatable functional zones can be selectively varied between single, two and three-phase and between current ratings of 10, 16, 20, 32, 40, 50, 63 amp. This allows flexible sub-main and final sub-circuit alterations without isolating other critical loads connected to the same switchboard. The result is that every conductor within the cable being connected or disconnected from the switchboard terminates in the individual isolatable functional zone to a circuit breaker, a fuse assembly, a terminal, or bolted to a copper link.

Embodiments of the invention obviate the need for electricians to interact with live conductors under load as none exist within isolated functional zones. The only conductors that require electrician interaction are individual circuits that are isolated by the functional zones. The individually isolatable functional zones of embodiments of the invention allow a wide range of procedures to safely undertaken without de-energising the entire system or a critical load supplied thereby. Such procedures can, for example, include: replacement of a faulty protective device (circuit breaker or fuse assembly); changing of the type, protection rating, phase connection, etc, of circuit breakers, fuse assemblies, residual current devices, etc; replacement, repair, connection, etc, of monitoring and/or control equipment; replacement, repair, connection, etc, of current transformers to primary input supplies to switchboards and outgoing sub-circuits; replacement, repair, connection, etc, of surge protection devices to switchboards; connection and disconnection to switchboards of sub-circuits, primary input supplies, fully rated parallel alternative input supplies, fully rated output supply sub-circuits, power quality analysers, etc; electrical reticulation design; thermographic survey, fault repair, etc; upgrading, updating, increasing capacity, etc; rapid power restoration to critical loads in case of breakdowns by accessing power from functional zones for the connection of temporary cables to supply temporary switchboard to restore power to critical loads; etc.

Embodiments of the invention can be implemented as a single final distribution switchboard that supplies uninterruptible power to critical electrical equipment, computing equipment, communication equipment, etc, in a industrial site, plant, facility, etc. The isolatable functional zones allow, for example, disconnection of redundant sub-circuits from the final distribution switchboard, connection of new sub-circuits to the final distribution switchboard, changing of the final sub-circuit protective device from single-phase to three-phase, variation of over current ratings, etc. In addition, the individually isolatable functional zones allow connection and disconnection of a fully rated parallel alternative input supply to the final distribution switchboard without interruption to critical loads.

The embodiments have been described by way of example only and modifications are possible within the scope of the invention disclosed. For example, the isolatable functional zones can be formed in or electrically connected to one or more components of electrical equipment in an electrical distribution system including at least one of an electrical switchboard, an electrical device, an electrical load, an electrical distribution sub-system, and electrical component and an electrical apparatus. The electrical equipment can include an uninterruptible power supply (UPS). In addition, embodiments of the invention can be implemented in AC or DC electrical distribution systems with no limitations to voltage or current.

The invention claimed is:

1. A power distribution system having a plurality of individually isolatable functional nodes each connected via an isolating device to a power distribution bus that is connected via an isolating device to a power input node which is connectable to a power source, wherein the power distribution bus and the isolating devices are housed in a power distribution compartment, and wherein the power input node and the functional nodes are housed separately from one another and the power distribution compartment in functional compartments adjacent thereto.

2. A power distribution system according to claim 1, wherein the power distribution bus is connected via an isolating device to an alternative power input/output node which is connectable to an alternative power source or a power output, wherein the alternative power input/output node is separately housed in a functional compartment adjacent to the power distribution compartment.

3. A power distribution system according to claim 1 or 2, wherein the isolating devices are selected from isolating switches, circuit breakers, fuses, and combinations thereof.

4. A power distribution system according to any preceding claim, wherein the power distribution compartment has a cover with apertures through which the isolating devices are individually accessible to enable the functional nodes, the power input node, and the alternative power input/output node to be individually isolated from the power distribution bus.

5. A power distribution system according to any preceding claim, wherein the power distribution compartment and the functional compartments are housed together in a power distribution unit cabinet or a switchboard cabinet.

* * * * *